H. P. R. L. PÖRSCKE & J. A. E. ACHENBACH.
ELECTRODE FOR SECONDARY GALVANIC CELLS.
APPLICATION FILED MAY 1, 1911.
1,066,651. Patented July 8, 1913.
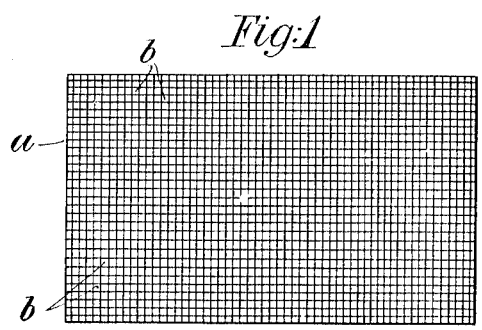
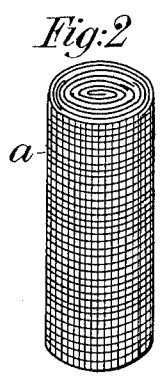 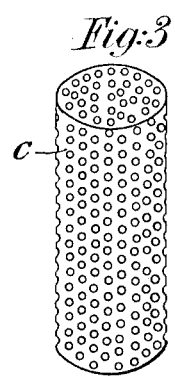
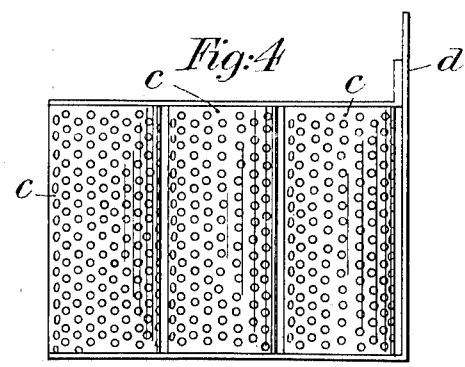
Witnesses:
C. N. Walter
H. Pausch
Inventors:
Heinrich Paul Rudolf Ludwig Pörscke
Julius Adolph Erwin Achenbach
by their Attorney:

UNITED STATES PATENT OFFICE.

HEINRICH PAUL RUDOLF LUDWIG PÖRSCKE AND JULIUS ADOLPH ERWIN ACHENBACH, OF HAMBURG, GERMANY.

ELECTRODE FOR SECONDARY GALVANIC CELLS.

1,066,651. Specification of Letters Patent. Patented July 8, 1913.

Application filed May 1, 1911. Serial No. 624,357.

*To all whom it may concern:*

Be it known that we, HEINRICH PAUL RUDOLF LUDWIG PÖRSCKE and JULIUS ADOLPH ERWIN ACHENBACH, subjects of the German Emperor, residing at Hamburg, in Germany, have invented a certain new and useful Improvement in Electrodes for Secondary Galvanic Cells, of which the following is a specification.

In the specification filed with our co-pending application Serial No. 622644 we have described the method of manufacturing an electrode for a secondary cell by pasting the active mass into the interstices of a piece of fine meshed metal fabric, and rolling said fabric upon a rod.

Our present invention consists in a modification of this method, and is illustrated in the accompanying drawing, in which, Figure 1 shows the metal fabric with the scales of active mass; Fig. 2 shows a roll of this fabric, Fig. 3, a receptacle for said roll, and Fig. 4, a composite electrode.

For the purpose of our present invention the fabric $a$, with scales $b$ of active mass in the interstices thereof, is formed into a compact cake, cylinder, rod or the like. This may be done by rolling the fabric, either a single piece thereof or a plurality of strips, as shown in Fig. 2. It may also be done by folding. The cake or block thus produced, consisting of a porous metal body with active mass in the interstices, is then placed in a perforated metal receptacle $c$ (Fig. 3), a suitable amount of pressure being used during the insertion, to produce good contact. This receptacle, with the "cake" therein, may be singly used as an electrode, or a plurality thereof may be collectively fixed to a conductive frame $d$, as shown in Fig. 4, to make a composite electrode.

What we claim as our invention and desire to secure by Letters Patent of the United States is:

An electrode for alkaline secondary batteries, which consists of poorly conductive active material in which is embedded a conductive carrier of very thin metal having a large number of minute perforations, the whole being tightly rolled to form a cylinder, and a perforated metal casing, inclosing such cylinder, a plurality of such elements being assembled in a metal frame.

In witness whereof we have signed this specification in the presence of two witnesses.

HEINRICH PAUL RUDOLF LUDWIG PÖRSCKE.
JULIUS ADOLPH ERWIN ACHENBACH.

Witnesses:
ERNEST H. L. MUMMENHOFF,
EDUARD HOPF.